350-96.27 SR

E197A XR 3,530,341

Sept. 22, 1970 R. C. HUTCHINSON 3,530,341

FLEXIBLE TAPE OPTICAL PROGRAMMER

Filed Oct. 31, 1966 2 Sheets-Sheet 1

Richard C. Hutchinson,
INVENTOR.
BY.
Gerald Singer
AGENT.

Sept. 22, 1970 R. C. HUTCHINSON 3,530,341
FLEXIBLE TAPE OPTICAL PROGRAMMER
Filed Oct. 31, 1966
2 Sheets-Sheet 2

Richard C. Hutchinson,
INVENTOR.
BY
AGENT.

United States Patent Office 3,530,341
Patented Sept. 22, 1970

3,530,341
FLEXIBLE TAPE OPTICAL PROGRAMMER

Richard C. Hutchinson, 346 N. Vermont Ave.,
Los Angeles, Calif. 90004

Filed Oct. 31, 1966, Ser. No. 590,969
Int. Cl. H01h 47/24
U.S. Cl. 317—127 6 Claims

ABSTRACT OF THE DISCLOSURE

A programming device using an endless loop of moving photographic film having a plurality of channels located lengthwise on the film in the direction of movement of the film. Changes in opacity and color on each of the channels is detected by selectively filtered photo cells for individually controlling external relay operated circuits; programming time selection being determined by the length of the endless tape selected.

This invention relates to a changeable program or timer and more particularly to a flexible tape programmer in which changes in the opacity of the tape and color of the tape is detected by photo cells for controlling external utilization circuits.

The prior art discloses the use of mechanically operated cams driven by a synchronous or induction motor in which the cams are individually moveable with respect to the driving shaft to thereby control the sequence of opening and closing of external circuits. Special purpose perforated tapes having openings and/or embossments mechanically cooperating with switch contacts are also disclosed in the prior art for controlling external circuits. The prior art most closely related to the present invention is illustrated in the Design News magazine dated Feb. 3, 1965 in an article entitled "Pencil-Programmed Timer." This article discloses a flexible disc capable of being made opaque by the application of a grease pencil. The pencil is used to opaque the film thereby interrupting the passage of light from a light source through the flexible disc to a corresponding photo cell. The above mentioned devices are representative of the present day programmers and timers available to industry. These present day devices all suffer from basically the same deficiency in that the length of programmer time available is a function of the size of the cam or disc used.

In the prior art external physical considerations not under the control of the user usually limit the maximum time that can be controlled and used. In addition, changing the time relationship in any given channel requires a change in the relative position of the cam with respect to the operating switch. The maneuver at best is time consuming, requiring special tools and the dismantling of at least a portion of the mechanical cam drive mechanism. A more fundamental defect is the problem associated with presetting the programming of a plurality of channels. In the mechanical cam driven system, the problems associated with setting up one cam per channel is complicated with the added requirement that a plurality of channels must be preset accurately, one with respect to the other. The disc-type programmer is also deficient in that the plurality of channels on the disc has non-linear time characteristics, one with respect to the other.

The present invention solves all of the problems associated with the prior art devices mentioned above. In the preferred embodiment, a flexible transparent film, for example a photograph film having a width of 70 mm. and sprocket holes along each edge, has been successfully used. The tape is cut and spliced into a continuous length depending on the longest program desired. The width is divided lengthwise into a plurality of individual channels which for the 70 mm. tape has been optimumly set at eleven channels. A sprocket drive mechanism is arranged to engage with the sprocket holes in the flexible tape in a driving relationship so as to move the tape in a preferred direction. A light source located on one side of the moving film illuminates each of the channels. Separate light detecting cells, one for each channel, are located adjacent the tape in such a manner that light associated with each channel is separately detected. In the preferred embodiment, the cells are located on that side of the moving tape opposite the light source; however, it is envisioned that reflected light may be detected whereby the cells may be physically located on the same side of the tape with the light source. The output of the cells control the operation of suitable switching devices in response to the presence or absence of light. In the simplest form of the invention, a grease pencil or separate opaquing strip having a width equal to at least an individual channel is placed on the tape over a channel or group of channels to determine the desired program. In another embodiment of the invention, different colored opaquing strips may be used, for example red and green. By using the same number of detecting cells per channel for each colored strip used, it is possible to obtain a plurality of different outputs from each channel. It is recognized that when different colors are used, suitable filters must also be used to assure, for example, that the red, green and white detecting cells will react only to their own color stimulus.

By means of the present invention it is now possible to change the maximum program time available by simply inserting a longer, endless, flexible tape. The individual preset programs and time setting may be changed by simply opaquing the tape in any conventional manner. The problems associated with presetting a plurality of channels is simplified, since the timed length for each channel is the same, and the time length is linear and hence easily set and coordingated, one with the other.

Further objects and advantages will be made more apparent as the description progresses, reference now being made to the accompanying drawings wherein.

Figure 1:
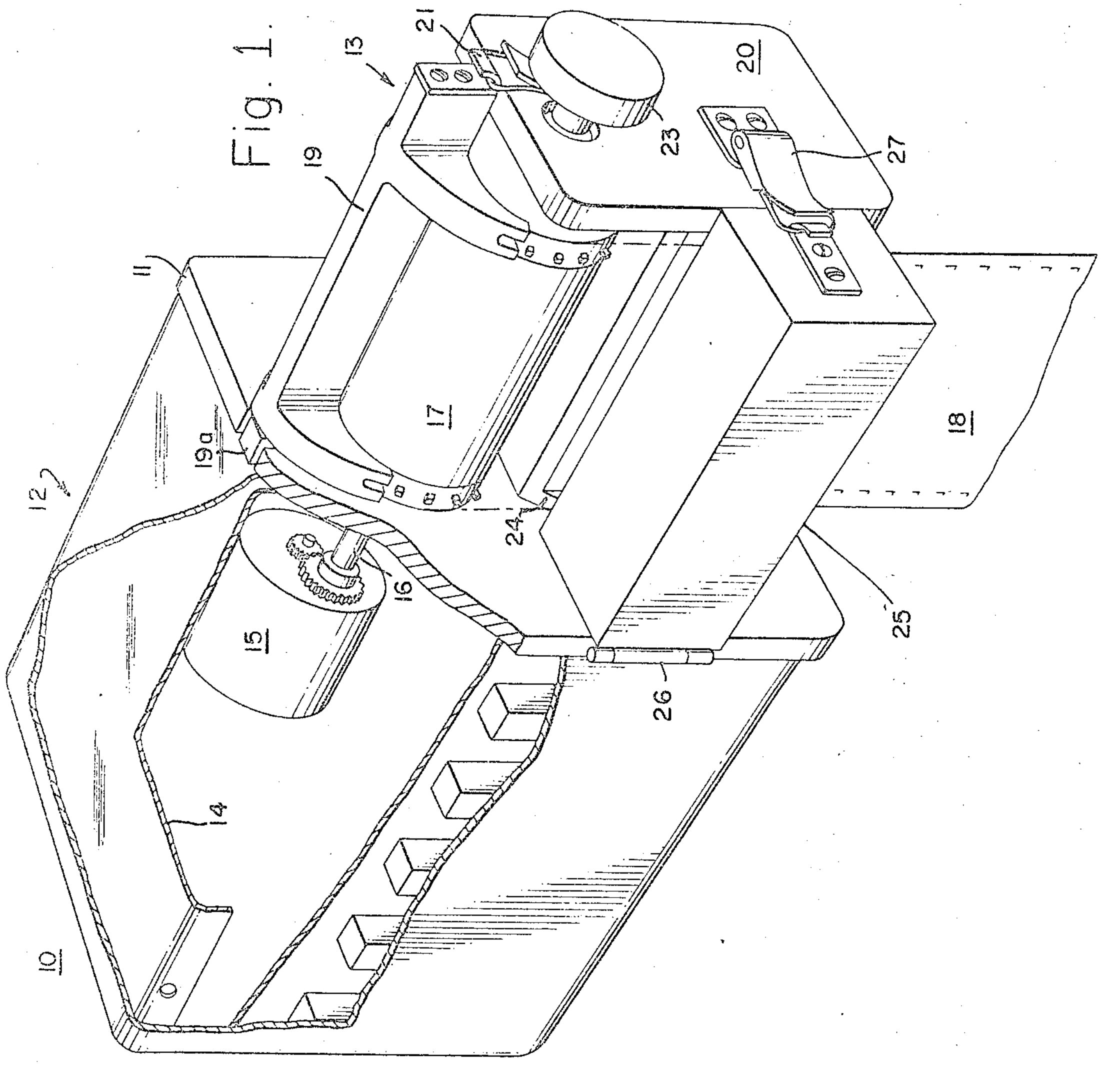
FIG. 1 is a perspective view illustrating a complete programmer constructed according to the principles of this invention.

Referring now to FIG. 1, there is shown a complete program assembly 10 constructed according to the principles of this invention. The program assembly 10 is constructed around a bulkhead 11 whereby the enclosed electronic portion 12 is supported by and located on one side of the bulkhead, and the film driving mechanism 13 is supported by and located on the other side of the bulkhead. A bracket 14 attached to the bulkhead 11 supports a geared motor 15 having a shaft 16 that protrudes through an opening in the bulkhead 11. The shaft 16 is directly connected to a film sprocket wheel 17 having a width coinciding with the width of the tape 18 being used. In the preferred embodiment, a photographic tape having a width of 70 millimeters was selected in view of the commercial availability of the film and the availability of standard parts for driving the film. The tape 18 is spliced and made into an endless belt depending only on the length of the longest program needed. A film guide 19 is pivotally connected at one end 19a to the bracket 11, and at the other end to an end plate 20. A latching mechanism 21 maintains the film guide in a closed position over the tape 18 when placed over the sprocket wheel 17, thereby maintaining the tape in a driving relationship with the wheel 17. Releasing the latch 21 and pivoting the film guide 19 about the pivot 19a located on the bulkhead 11 allows the tape 18 to be relocated on the sprocket wheel 17 and replaced with tapes of other sizes and programs, depending on the needs of the user. An adjusting knob 23 physically attached to one end of shaft 16 is also useful for advancing the program film or overriding the drive motor 15. Located directly below the film sprocket wheel 17 is a photo cell housing 24 which contains the individual photo cells depending on the number of channels used on tape 18. The photo cell housing 24 is physically connected at one end to the bulkhead 11, and at the other end to the end plate 20, thereby providing physical stability for the bearing supporting the film sprocket wheel 17. The alignment of the photo cell housing 24 is critical in order to assure alignment between the individual channels located on the tape 18. The tape 18, when located in the operating position, will be draped over the film sprocket wheel 17 and cover the photo cell housing 24 in the defined aligned position. The end plate 20 and the bulkhead 11 additionally form guiding surfaces to assure the registration of the individual channels located on the tape 18 with the individual photo cells located in the photo cell housing 24. The necessary wires connecting the individual photo cells with the additional relays being controlled are directed through openings located within the bulkhead 11. The source of illumination may comprise a plurality of individual lamps or a single lamp transversing all channels on the tape 18, and in the preferred embodiment is located in a lamp housing 25. The lamp housing 25 is pivotally attached to the bulkhead 11 by means of a hinge 26. The opposite end of the lamp housing 25 is attached to the end plate 20 by means of a clamp 27, thereby allowing the lamp housing to be moved by rotation about the hinge 26. In order to replace tape 18, it would be necessary to open latch 27 and latch 21 thereby permitting the lamp housing 25 and the film guide 19 to be pivoted away from the tape being replaced.

Figure 2:
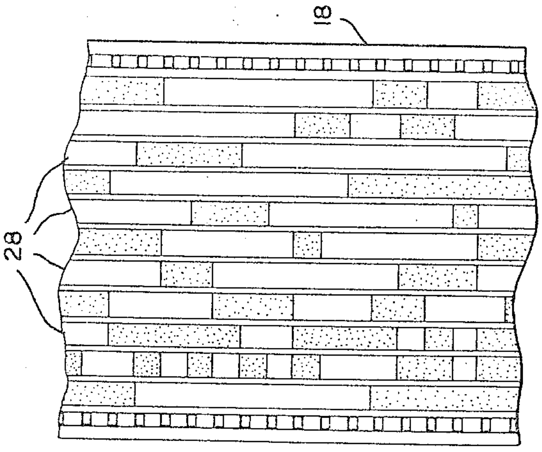
FIG. 2 illustrates a portion of the continuous tape formed from 70 millimeter photographic film and containing eleven channels.

Referring now to FIG. 2, there is shown a section of the tape 18 containing sprocket holes on each side of the tape and the individual channels 28 running lengthwise of the tape 18. Each channel 28 is separately programmed by opaquing that portion of the tape as required by the external needs of the program. In this manner the individual photo cell associated with that channel will be sequenced on and off depending upon the opacity of the tape. In one embodiment grease pencil may be used to opaque the tape, or strips of opaque material may be placed lengthwise on the channels for controlling the opacity of film. These strips may have the characteristics of masking tape and cover more than one channel for synchronizing channels. The width of the tape used for any embodiment is not limited to the 70 millimeter photographic film described herein, but may have any width depending on the needs of the system and the availablity of the selected tape.

Figures 3, 4:
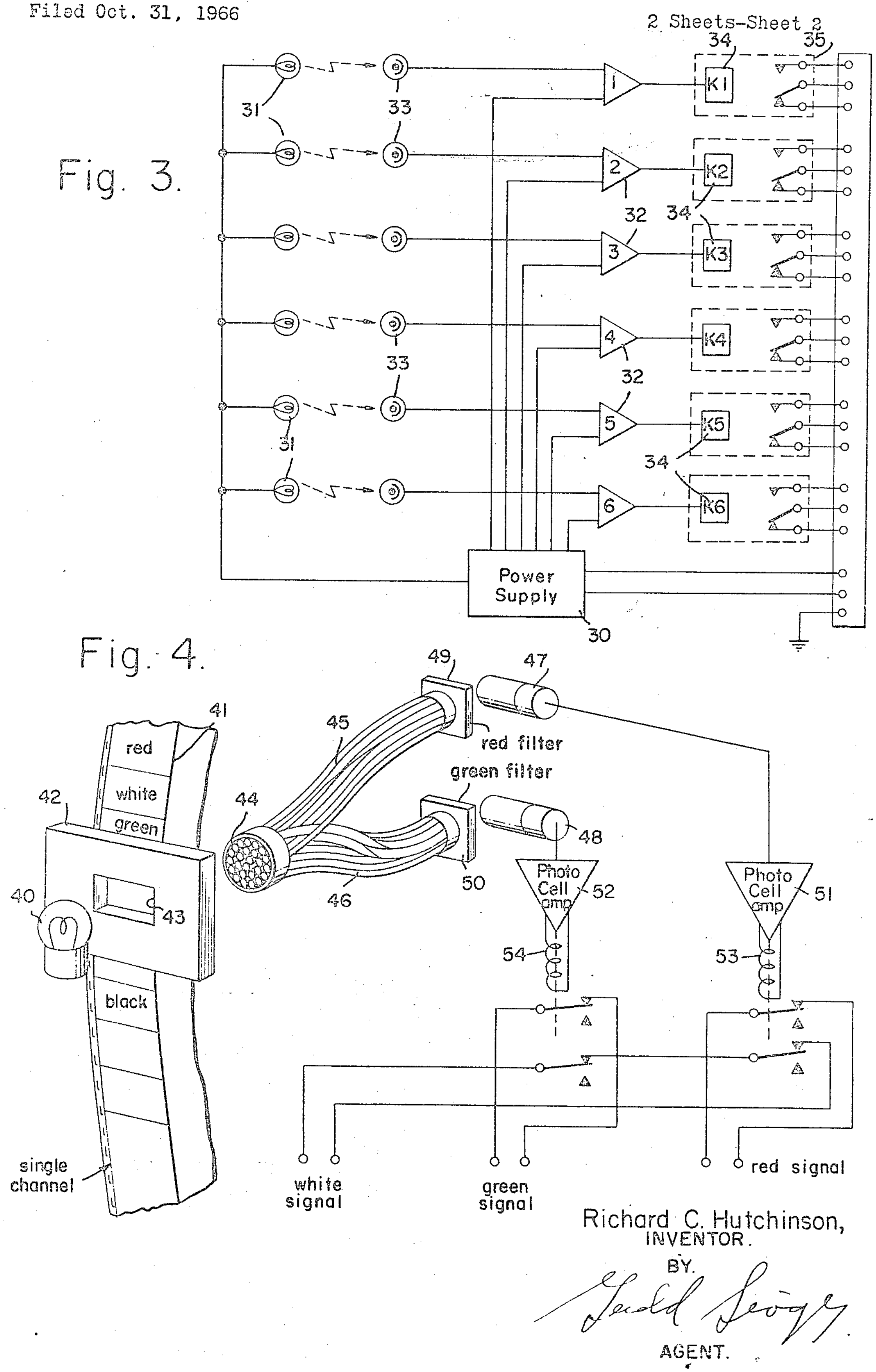
FIG. 3 is a schematic diagram illustrating the preferred electrical connections for controlling the individual channels.
FIG. 4 is a schematic diagram illustrating the use of color markings on the photographic tape for different channels for obtaining a plurality of different outputs from each channel.

Referring now to FIG. 3, there is shown a schematic diagram illustrating the necessary electrical connections and circuits for a six channel programmer of the type illustrated in FIG. 1. A power supply 30 is connected to a commercially available input supply voltage and is used to operate the individual lamps 31 and the individual photo cell amplifiers 32 associated with each channel. As mentioned previously, individual lamps or a single lamp may be used to illuminate all channels. The individual photo cells 33 are arranged to detect the light passing through or reflected from the transparent portions of the tape to thereby generate a current which is amplified by the individual photo cell amplifiers 32. In the presence of an opaque portion of tape, light will not be detected by the photo cell, and hence the photo cell amplifiers will be turned off. In the presence of a transparent portion of tape, the photo cells 33 will detect the light generated by the lamps 31 and generate a current that is amplified by the photo cell amplifiers 32, which in turn control and operate an individual relay 34, one for each photo cell amplifier. Controlling the individual relays 34 has the effect of opening or closing contact points 35 associated with each relay 34, which thereby open or close and hence control the sequencing of external circuitry connected to the individual contacting points.

Referring now to FIG. 4, there is illustrated another embodiment of the invention which uses color detecting means in combination with fiber optics for detecting a plurality of different signals from a single channel. The diagram is admittedly schematic in nature in order to more fully illustrate how different colors on any given channel may be used to thereby obtain different outputs from a single channel based only on the detected colors. The illustration of FIG. 4 may be used in the embodiment illustrated in FIG. 1 with slight mechanical modifications that would be apparent to one skilled in the art. A light source illustrated by bulb 40 is shown illuminating a single channel on tape 41 through a suitable light mask 42. An aperture 43 located in the light mask 42 is arranged in conjunction with the tape 41 to illuminate a single channel on the tape. As mentioned previously, either a single light source may be used or a plurality of individual light sources, one for each channel on the tape 41, may be used. The details concerning the use of an individual light source and the kind of light mask used is dictated by the mechanical space limitations and the width of the tape selected. The white light illuminating a given channel is detected by the end portions of a bundle of fiber optics arranged to detect the light passing from a given channel on tape 41 as illustrated by reference 44. The present embodiment is directed to the use of two different colors, such as red and green. The channel in question may either be transparent to the white light emanating from light source 40 or the channel may be covered by a green strip adapted to pass only green light, or conversely a red strip may be used which is adapted to pass only red light. In addition, the tape 41 may be left transparent (white) or completely opaqued (black). The light, be it white, green or red, is detected by the end portion of the fiber optic bundles at 44 and passed through the individual fiber optics 45 and 46 which are connected to individual photo cells 47 and 48, respectively. Located intermediate the fiber optics 45 and photo cell 47 is a red filter 49 arranged to pass only red light. Similarly, a green filter 50 is located intermediate fiber optics 46 and photo cell 48 thereby insuring that only green light will energize photo cell 48. The output of photo cells 47 and 48 are fed to suitable amplifiers 51 and 52, respectively, for controlling relays 53 and 54. In operation, a red strip on tape 41 will energize photo cell 47 and ultimately energize relay 53. Similarly, a sequentially located green strip on tape 41 will energize photo cell 48 and ultimately control relay 54, the result being that the green filter and the red filter may be used to operate separate relays located on the same channel. In addition, merely opaquing any given channel on tape 41, or conversely allowing the channel on the tape to be transparent to white light, will energize both photo cells 47 and 48, thereby controlling both relays 53 and 54. It will be appreciated, therefore, that using different colors on a given channel will allow different colors to operate separate relays, thereby providing a plurality of different output signals depending only on the number of colored strips used on the programming tape 41. Conversely, simply opaquing the channel 41 will allow the embodiment of FIG. 4 to operate in the conventional manner of FIG. 1.

This completes the description of the embodiment of the invention illustrated herein. However, many modifications and advantages thereof will be apparent to persons skilled in the art without departing from the spirit and scope of this invention.

What is claimed is:

1. In combination, an endless flexible film having a plurality of lengthwise channels alternating in opaqueness according to a predetermined pattern and adapted to be advanced by suitably located sprocket holes in said film, a sprocket drive mechanism mating with said holes in said film whereby said film is movable in a preferred direction, a light source located on one side of said film for illuminating each of said channels, separate light detecting cells, one for each channel, located adjacent to each of said channels whereby light associated with each channel is separately detected, a plurality of electrically operated switching means, each separately controlled by one of said cells whereby alternate periods of opaqueness in a given channel alternately operates one of said switching means, wherein said film is opaqued by flexible adhesive backed strips having a width substantially equal to the width of a channel.

2. A combination according to claim 1 in which each strip is opaque to a different portion of the color spectrum of said light source.

3. In combination, an endless flexible film having a plurality of lengthwise channels alternating in opaqueness according to a predetermined pattern and adapted to be advanced by suitably located sprocket holes in said film, a sprocket drive mechanism mating with said holes in said film whereby said film is movable in a preferred direction, a light source located on one side of said film for illuminating each of said channels, separate light detecting cells, one for each channel, located adjacent to each of said channels whereby light associated with each channel is separately detected, a plurality of electrically operated switching means, each separately controlled by one of said cells whereby alternate periods of opaqueness in a given channel alternately operates one of said switching means, and a plurality of light detecting cells for each channel, each responsive to a different portion of the color spectrum of said light source, each of said cells connected to a separate switching means whereby each of said individual switching means on each cell in a single channel is selectively controlled.

4. A combination according to claim 3 which includes fiber optics for conveying the detected light from a single channel into the plurality of light detecting cells associated with said channel.

5. In combination, an endless flexible film having a plurality of lengthwise channels alternating in color according to a predetermined pattern and adapted to be advanced by suitably located sprocket holes in said film, each channel having a plurality of colors, a sprocket drive mechanism mating with said holes in said film whereby said film is movable in a preferred direction, a light source located on one side of said film for illuminating each of said channels, separate light detecting cells, one for each color, on each channel located adjacent to each of said channels whereby light associated with each channel is separately detected, and a plurality of electrically operated switching means, one for each cell, each separately controlled by one of said cells whereby alternate periods of opaqueness in a given channel alternately operates one of said switching means.

6. A combination according to claim 5 which includes a different light filter before each cell located on a given channel.

References Cited

UNITED STATES PATENTS

| | | | |
|---|---|---|---|
| 2,266,779 | 12/1941 | Loughridge et al. | 317—127 XR |
| 2,302,025 | 11/1942 | Gould | 317—127 XR |
| 2,686,282 | 8/1954 | Salamonovich | 250—208 XR |
| 2,732,504 | 1/1956 | Steele | 250—208 |
| 3,005,106 | 10/1961 | Wilkens | 250—208 |
| 3,125,683 | 3/1964 | Stewart et al. | 250—208 XR |
| 3,271,677 | 9/1966 | Peter et al. | 317—127 XR |

FOREIGN PATENTS

| | | |
|---|---|---|
| 948,636 | 2/1964 | Great Britain. |

WILLIAM M. SHOOP, Jr., Primary Examiner

U.S. Cl. X.R.

250—219